US012285694B1

United States Patent
Cioflica et al.

(10) Patent No.: US 12,285,694 B1
(45) Date of Patent: Apr. 29, 2025

(54) GAME WINDOW

(71) Applicant: FanDuel Limited, Edinburgh (GB)

(72) Inventors: Vlad-Alexandru Cioflica, Cluj-Napoca (RO); Dan Laslo-Faur, Cluj-Napoca (RO)

(73) Assignee: FanDuel Limited, Edinburgh (GB)

( * ) Notice: Subject to any disclaimer, the term of this patent is extended or adjusted under 35 U.S.C. 154(b) by 0 days.

(21) Appl. No.: 18/624,843

(22) Filed: Apr. 2, 2024

(51) Int. Cl.
*A63F 9/24* (2006.01)
*A63F 13/35* (2014.01)
*A63F 13/60* (2014.01)
*A63F 13/77* (2014.01)

(52) U.S. Cl.
CPC .............. *A63F 13/77* (2014.09); *A63F 13/35* (2014.09); *A63F 13/60* (2014.09); *A63F 2300/40* (2013.01); *A63F 2300/538* (2013.01); *A63F 2300/5513* (2013.01); *A63F 2300/60* (2013.01)

(58) Field of Classification Search
None
See application file for complete search history.

(56) References Cited

U.S. PATENT DOCUMENTS

| | | | |
|---|---|---|---|
| 8,556,724 B2 * | 10/2013 | Dale | A63F 13/358 718/105 |
| 11,918,896 B2 * | 3/2024 | Kamphuis | A63F 13/358 |
| 2011/0212783 A1 * | 9/2011 | Dale | A63F 13/798 463/42 |
| 2017/0289170 A1 * | 10/2017 | Stuntebeck | H04L 63/08 |

* cited by examiner

*Primary Examiner* — Sunit Pandya
(74) *Attorney, Agent, or Firm* — Erise IP, P.A.

(57) ABSTRACT

Systems, methods, and computer-readable media for providing a game to a user through a user interface. A gaming platform may include a game client, a game window, a message flow, a launcher, a game launch service, a game provider, a platform back end, and a testing module. The game client may provide the game. The game client may be embedded in the game window. The game window may provide the ability for a user to interact with the game through an input, as well as one or more interface elements agnostic to the game. The message flow may facilitate the translation and communication of a message from a first format associated with the game client and a second format associated with the game window.

20 Claims, 8 Drawing Sheets

GAME WINDOW

BACKGROUND

1. Field

Embodiments of the present disclosure relate to front-end architectures. More specifically, embodiments of the present disclosure relate to front-end gaming architectures.

2. Related Art

Gaming companies often provide a wide range of games from a wide range of companies (e.g., third-party game providers). Typically, third-party game providers have varying ways in which they present elements of the user interface associated with their games in comparison to other game providers. However, no matter what game customers launch, some elements of the user interface, as well as the functionality of those elements, should be present. For example, games typically require audio controls and a way to exit the game. If the third-party game providers are allowed to control these aspects, however, the user experience across the gaming platform may be inconsistent, resulting in users potentially having a difficult time locating some elements of the user interface.

Further, it is often desirable to test the functionality of games as displayed to users in a virtual environment. As a part of such testing, it is desirable to ensure all the controls displayed to a user are functioning properly. For example, tests may need to be run to ensure that clicking a "spin" button on a game initiates transactions associated with a bet and the spinning animation. Prior techniques for testing components, however, typically require testers to manually interact with and test every component on a user interface. Given the large number of games typically provided by gaming platforms, testing the functionality of aspects of the games may take large amounts of time and resources to conduct in an efficient and thorough manner.

Thus, what is desired are systems and methods that provide a uniform way to display and interact with games for a consistent user experience, as well as systems and methods for testing components of games without the need for human testers.

SUMMARY

In some aspects, the techniques described herein relate to a system for providing a game to a user, the system including: a game client operable for providing the game; a game window in which the game client is embedded, the game window operable for receiving input corresponding to the game from the user; an event flow operable for facilitating a message transmission between the game client and the game window; and a game provider configured to communicate with the game client and a component of a platform backend.

In some aspects, the techniques described herein relate to a system, wherein the game window is operable for providing a plurality of game agnostic components in a user interface.

In some aspects, the techniques described herein relate to a system, wherein the system further includes: a launcher operable to initiate a launching of the game in the game client; and a game launch service configured to obtain and construct a set of launch data corresponding to the launching of the game from the platform backend.

In some aspects, the techniques described herein relate to a system, wherein the system further includes: a testing module operable to conduct a test on the game window.

In some aspects, the techniques described herein relate to a system, wherein the test on the game window is configured to analyze the message transmission between the game client and the game window.

In some aspects, the techniques described herein relate to a system, wherein the testing module includes one or more machine learning models trained on prior testing information.

In some aspects, the techniques described herein relate to a system, wherein the component of the platform backend includes a user session manager.

In some aspects, the techniques described herein relate to a system for providing a game to a user, the system including: a game client operable for providing the game; a game window in which the game client is embedded, the game window operable for receiving an input corresponding to the game from the user; an event flow operable for facilitating a message transmission between the game client and the game window, the event flow including: an event mapper operable to translate a message from a first format to a second format; and an event handler operable to route the message to a recipient; and a game provider configured to communicate with the game client and a component of a platform backend.

In some aspects, the techniques described herein relate to a system, wherein the first format is associated with the game client and the second format is associated with the game window.

In some aspects, the techniques described herein relate to a system, wherein the event mapper is operable to translate the message from the second format to the first format when routed by the event handler from the game window.

In some aspects, the techniques described herein relate to a system, further including: a testing module operable to test whether the message has been translated from the first format to the second format by the event mapper.

In some aspects, the techniques described herein relate to a system, further including: a testing module operable to utilize a machine learning model to determine a button associated with the input of the user.

In some aspects, the techniques described herein relate to a system, wherein the component of the platform backend includes a financial account associated with the user.

In some aspects, the techniques described herein relate to a system, wherein the game client is operable to update a user interface element associated with the input upon receiving the message from the game window.

In some aspects, the techniques described herein relate to one or more non-transitory computer-readable media including computer-executable instructions that, when executed by at least one processor, perform a method of testing a game provided to a user, the method including: receiving a set of training data; training a model using the set of training data; conducting training on the game provided to the user; and receiving, after conducting training on the game provided to the user, a set of test results.

In some aspects, the techniques described herein relate to one or more non-transitory computer-readable media, wherein conducting training on the game provided to the user includes: selecting a first interface element provided by a game window; transmitting a message in a first format associated with the game window; translating the message to a second format associated with a game client; receiving, by the game client, the message; and updating, by the game client a second interface element provided by the game client.

In some aspects, the techniques described herein relate to one or more non-transitory computer-readable media, wherein the set of test results includes an indication of if the game client updated the second interface element upon selecting the first interface element.

In some aspects, the techniques described herein relate to one or more non-transitory computer-readable media, wherein the method further includes: updating the set of training data; and retraining the model using the set of training data.

In some aspects, the techniques described herein relate to one or more non-transitory computer-readable media, wherein the method further includes: launching a game client within a game window, wherein the game is provided by the game client.

In some aspects, the techniques described herein relate to one or more non-transitory computer-readable media, wherein the game window includes a frame surrounding the game provided by the game client.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
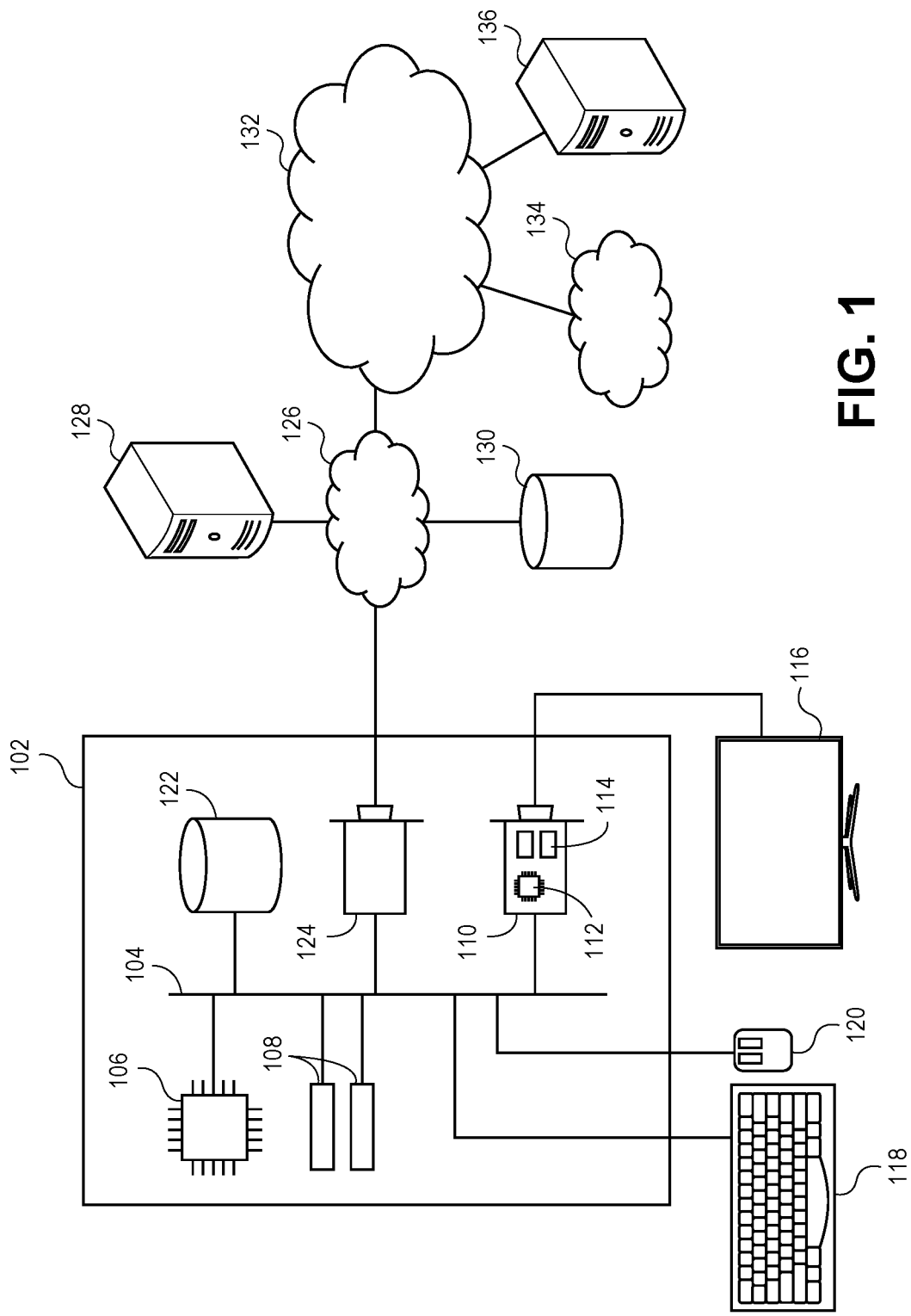
FIG. 1 illustrates an exemplary hardware platform, in accordance with embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

The following disclosure is directed to systems and methods for providing a game to a user through a user interface. In some embodiments, a gaming platform 200 includes a game client, a game window, a message flow, a launcher, a game launch service, a game provider, a platform back end, and a testing module. In some embodiments, the game client may provide the game. The game client may be embedded in the game window. In some embodiments, the game window may provide the ability for a user to interact with the game through an input, as well as one or more interface elements agnostic to the game. In some embodiments, the message flow may facilitate the translation and communication of a message from a first format associated with the game client and a second format associated with the game window. In some embodiments, the launcher facilitates the launching of the game in the game client embedded in the game window. The game launch service may facilitate the launching the game by interfacing with one or more components of the platform backend. The game provider may provide the game launch service with a game-specific launch flow. The testing module may conduct a set of tests on the game window.

FIG. 1 illustrates an exemplary hardware platform relating to some embodiments of the present disclosure. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Gaming Platform Architecture

Figure 2:
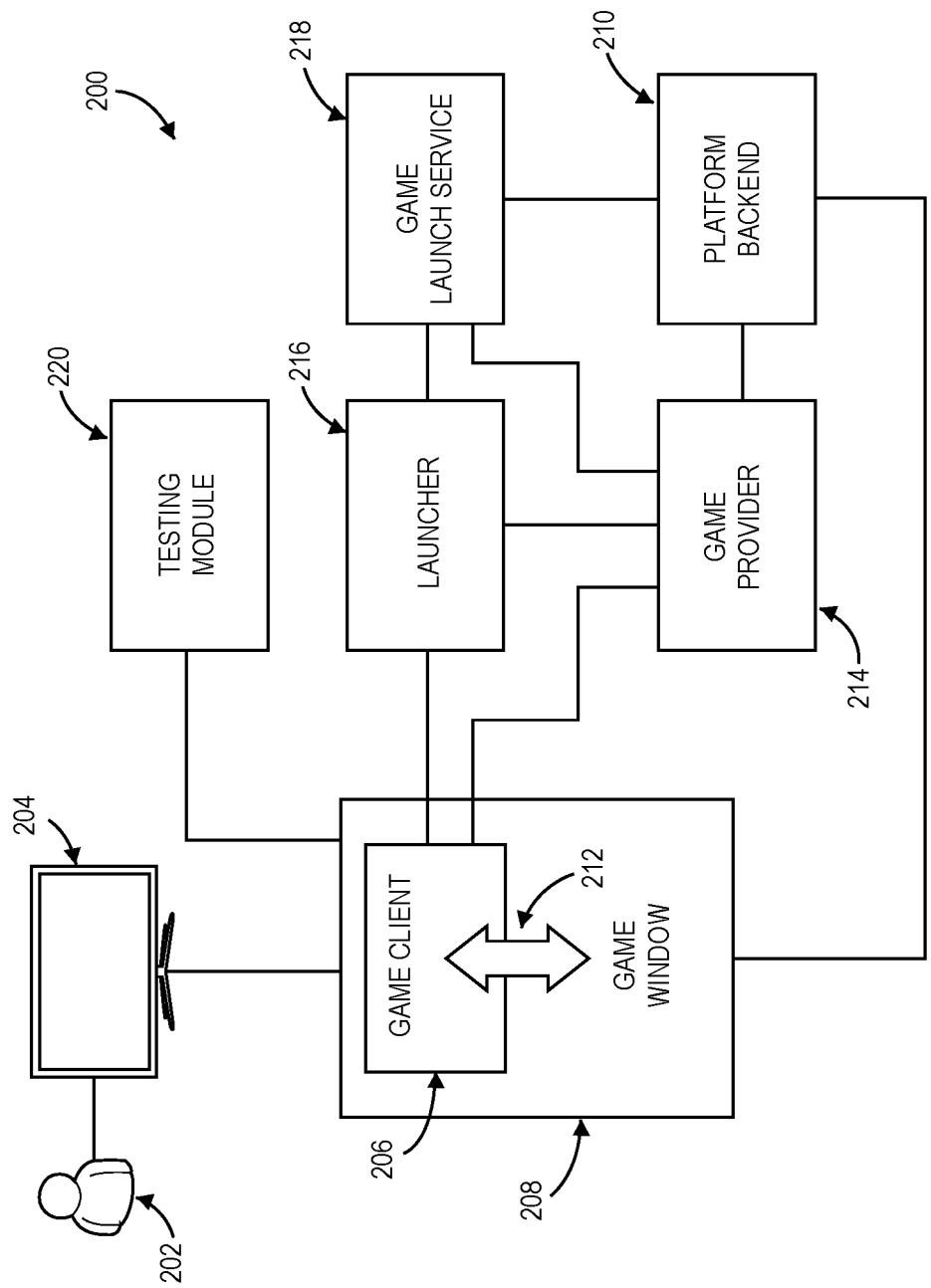
FIG. 2 illustrates an exemplary gaming platform, in accordance with embodiments of the present disclosure.

FIG. 2 illustrates an exemplary gaming platform, in accordance with embodiments of the present disclosure. Generally, gaming platform 200 may provide a platform for uniformly launching games from one or more game providers. Gaming platform 200 may provide a front-end architecture for displaying games to user 202 using user interface 204. Games may include any games now known or later developed, including, but not limited to, casino games, betting games, sports games, slot machine games, card games, and the like. In some embodiments, the games may be launched on any number of platforms, including, but not limited to, web browsers, web applications, mobile applications, and the like.

In some embodiments, user 202 may launch and/or access an instance of game client 206 and game window 208 (discussed below) through user interface 204. User 202 may be any user of a gaming platform, including a person, a group, a tester, an administrator, another platform, a computer, and the like. User interface 204 may be any device now known or later developed for displaying and/or interacting with game client 206 and game window 208, including, but not limited to, a computer, a monitor, a database, a mobile device, VR headset, and the like. It is noted herein that different user interfaces may require any number of additional steps for accessing, launching, and interacting with games provided by game client 206 and game window 208.

In some embodiments, gaming platform 200 may include game client 206. Game client 206 may provide functionality to a game provided by a third-party provider. For example, game client 206 may provide functionality for an online slot machine game that allows a user to initiate a virtual slot machine spin. Further, game client 206 may interface with additional elements of a given platform in order to facilitate a transaction corresponding to one or more user actions, inputs, and/or interactions with game client 206. For example, game client 206 may interface with platform back end 210 to access a financial account (e.g., a wallet) associated with the user interacting with game client 206.

In some embodiments, game client 206 may facilitate the display of a graphical user interface to user 202 through user interface 204. For example, game client 206 may manage the front-end assets of a graphical user interface, such that it facilitates the display of the assets to user 202 through user interface 204. The front-end assets may include any assets now known or later developed, including, but not limited to, colors, shapes, images, etc. associated with games.

Figure 5A:
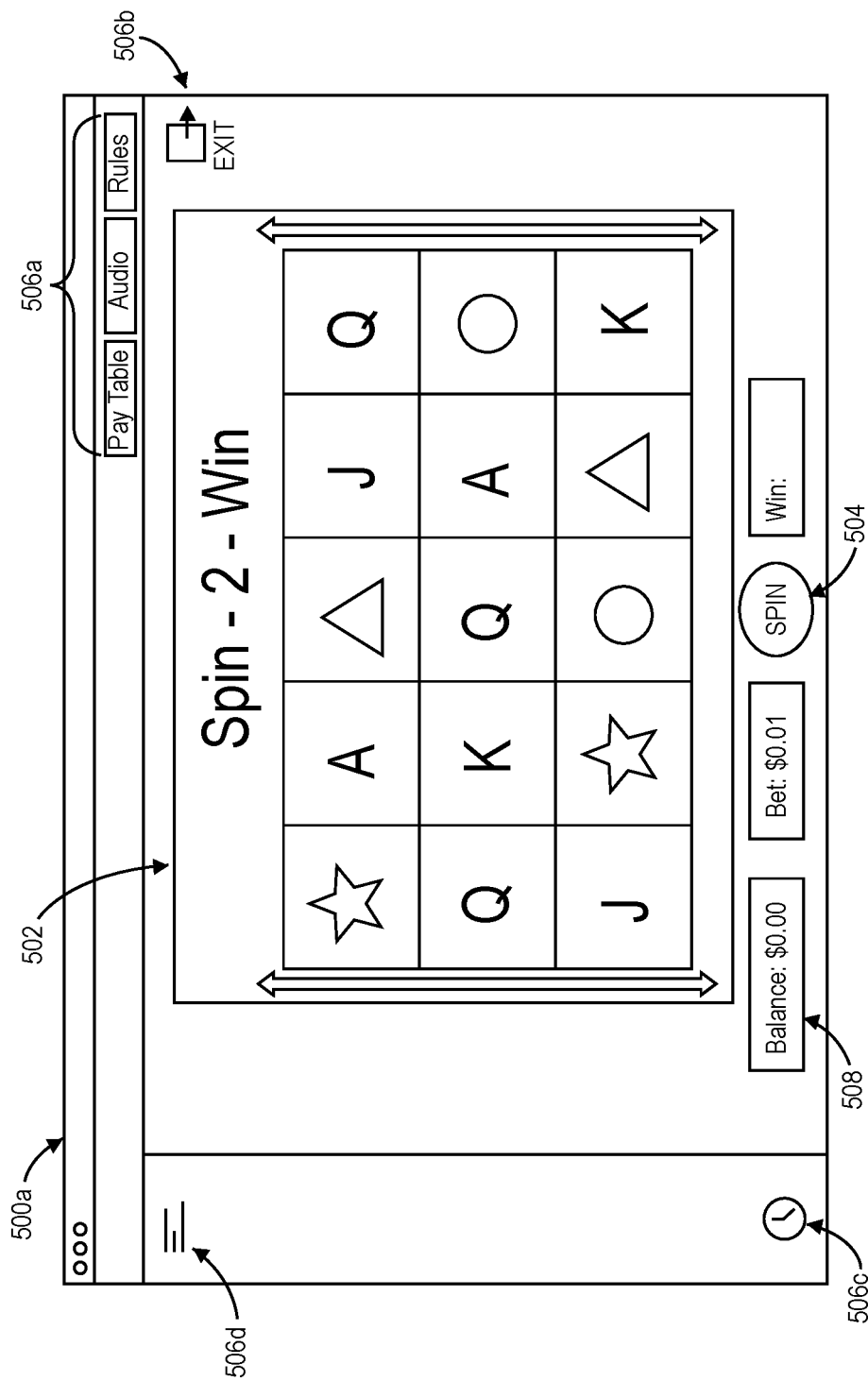
FIG. 5A illustrates an exemplary gaming interface, in accordance with embodiments of the present disclosure.

In some embodiments, game client 206 may be embedded in game window 208. Game window 208 may facilitate the display of game-agnostic GUI elements to user 202 through user interface 204. For example, as depicted in FIG. 5A, game window 208 may facilitate the display of game-agnostic controls such as an exit game control, volume control, pay tables, rules, audio settings, time, and platform menu. Generally, game-agnostic controls are controls that may be utilized by user 202 regardless of that particular game being displayed by game client 206. As such, game window 208 may provide an HTML frame element (such as an iframe that surrounds game client 206) that may include game-agnostic assets. In some embodiments, if game-agnostic controls are provided by game window 208 that overlap one or more functionalities provided by game client 206, game client 206 may suppress one or more native attributes corresponding to the overlapping functionalities between game window 208 and game client 206. By way of example, game client 206 may suppress native audio controls provided by the game itself in the event that game window 208 provides audio controls. Accordingly, user 202 may not be presented with redundant audio controls and instead may only view those presented by game window 208.

In some embodiments, game window 208 may interface with platform back end 210 to facilitate a transaction. For example, when user 202 launches game window 208, game window 208 may interface with platform back end 210 in order to request information to facilitate the launching of game window 208, user account information associated with user 202, session management information, and the like. In some embodiments, platform back end 210 may transmit messages—including, but not limited to, push notifications, promotional messages, regulatory messages, and the like—to game client 206 and/or game window 208. Accordingly, the messages transmitted by platform back end 210 may be displayed to user 202 via user interface 204. For example, the messages may be displayed to user 202 in the form of a graphical element.

In some embodiments, game client 206 and game window 208 may interface with one another. In such embodiments, game client 206 and game window 208 may interface through message flow 212. As discussed below with respect to message flow 400 of FIG. 4, message flow 212 may facilitate the communication between game client 206 and game window 208. Broadly, each game provider 214 may configure the game to output messages in a particular format—a format that may be any of the message formats of game window 208, platform back end 210, other game providers, and the like, or may be a distinct format. Game window 208 may provide a library of standard messages understood by game window 208 and platform back end 210. As such, message flow 212 may translate a message sent in a format specific to game provider 214 to the format of the standard messages understood by game window 208 and platform back end 210. For example, game client 206 may send out a message to game window 208. Accordingly, message flow 212 may translate the message prior to routing the message to game window 208. Examples of messages are discussed further below with respect to FIG. 4. Additionally, as described further with respect to FIG. 4, message flow 212 may facilitate the routing of messages to various parts of the system, such as to platform back end 210.

In some embodiments, game client 206 and/or game window 208 may interface with launcher 216 in order to launch game client 206 and game window 208. In some embodiments, launcher 216 may be embedded within game client 206 and/or game window 208. Generally, launcher 216 may facilitate one or more processes involved with launching game client 206 and game window 208, including launching game client 206 within game window 208. In order to do so, as discussed further with respect to FIG. 3, launcher 216 may interface with any number of additional components of gaming platform 200.

For example, in some embodiments, launcher 216 may be connected to game launch service 218. Launcher 216 may interface with game launch service 218 to initiate back-end processes for launching game client 206 and game window 208. For example, game launch service 218 may connect to platform back end 210 in order to begin a new gaming session associated with user 202 and the particular game being launched.

For another example, in some embodiments, launcher 216 may be connected to game provider 214. Launcher 216 may request game-specific information from game provider 214. For example, launcher 216 may request game provider-specific launch information, including how to launch particular assets to be displayed to user 202 through user interface 204. For another example, launcher 216 may request access to various components of the game provided by game provider 214 in order to suppress and/or access certain assets, such as audio controls.

In some embodiments, game window 208 may interface with testing module 220. Broadly, testing module 220 may initiate testing of any number of features of game window 208 and game client 206. For example, testing module 220 may initiate testing of the communication of messages between game window 208 and game client 206 through message flow 212. Accordingly, testing module 220 may be able to determine whether the interaction of user 202 with game window 208 results in accurate messages and instructions being communicated to game client 206.

In some embodiments, testing module 220 performs automated testing on game window 208 and game client 206. For example, in some embodiments, testing module 220 may be informed by one or more machine learning models in order to test the functionality of game window 208. For example, testing module 220 may utilize knowledge of the previous testing conducted by testing module 220 in order to determine whether the testing generated the outcomes expected by testing module 220. Accordingly, testing module 220 may modify various tests. For example, testing module 220 may test various components displayed to user 202 through user interface 204 to ensure that user 202 selecting various components displayed results in the intended action associated with the various components. As such, testing module 220 may need to know the location of the various components to enable their selection by testing module 220. Accordingly, testing module 220 may modify various tests if the machine learning models are informed that not all of the components being displayed to user 202 were correctly being actuated by testing module 220 during a prior test. Testing module 220 may perform image processing (such as, for example computer vision or image processing techniques) to identify locations of the components and may modify the tests to ensure the future accuracy of the estimated locations of the various components of game window 208.

Machine learning models utilized by testing module 220 may be any suitable model now known or later developed, including, but not limited to, linear regression, logistic regression, support vector machines, naive bayes, k-nearest neighbors, boosting algorithms, decision trees, random forest, neural networks, classifiers, reinforcement learning, cluster analysis, k-means clustering, large language models, and similar machine learning models. In such embodiments, the machine learning model used by testing module 220 may be trained off a variety of training data sets. The information included in the training data sets may be any suitable information for optimizing testing, including, but not limited to, prior testing information, component information, rendering information, web engine or app layout data, transactional information, messaging information, game provider information, consumer behavior information, user interface specific information, and similar information. Using machine learning to inform testing conducted by testing module 220 may allow for more efficient testing such that a given game can be tested in a shorter period of time. Accordingly, testing module 220 may conduct a large number of tests on a large variety of games in a more time-efficient manner.

Figure 3:
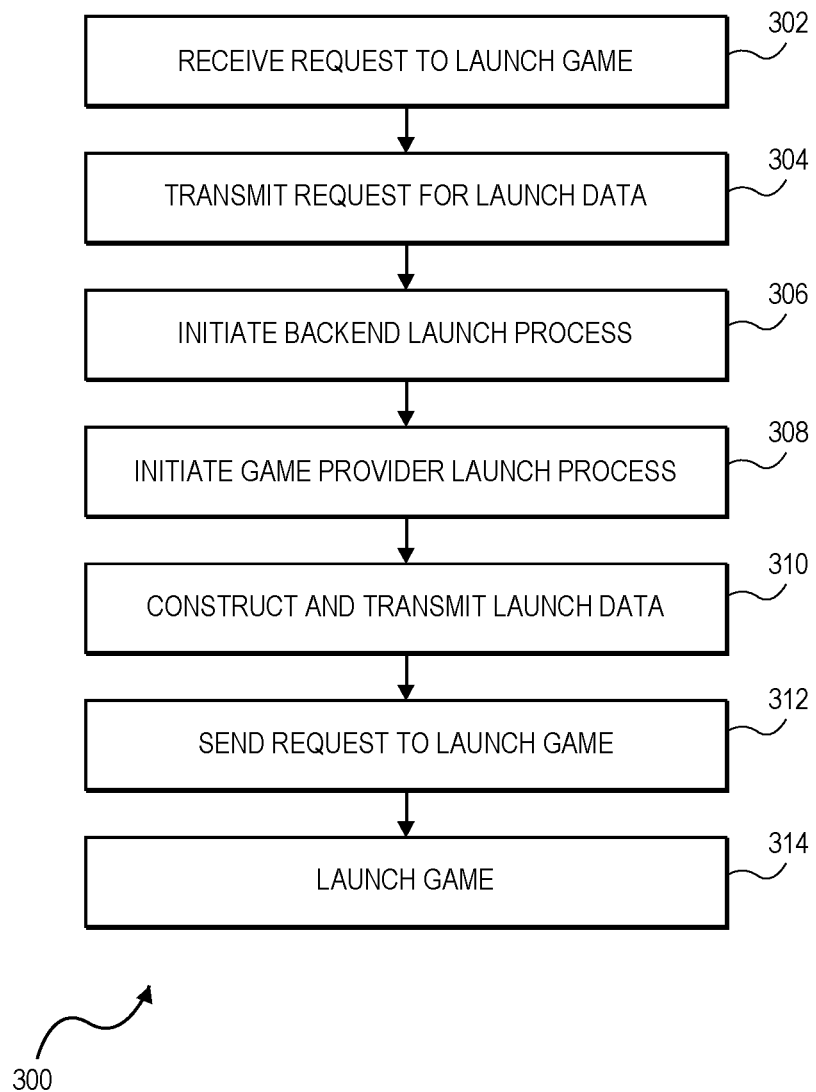
FIG. 3 illustrates an exemplary method flow chart, in accordance with embodiments of the present disclosure.

Continuing on, FIG. 3 depicts an exemplary flow chart for illustrating the operation of method 300 for launching game client 206 within game window 208, in accordance with embodiments of the present disclosure. At step 302, a request is received to launch a particular game. In some embodiments, the request is received from user 202 through user interface 204. For example, user 202 may access the web through a computer associated with user interface 204, navigate to a particular URL containing additional URLs, and select a particular URL associated with a game they wish to launch. To illustrate, user 202 may transmit a request to access the game "Spin-2-Win." In some embodiments, the request to launch the game may be received by game window 208. Upon receiving the request to launch the game, game window 208 may facilitate the transactions that may need to occur in order to launch the game utilizing the instance of game client 206 and game window 208.

At step 304, a request for launch data is transmitted. In some embodiments, the request for launch data may be transmitted to game launch service 218 which may gather the launch data from other elements of gaming platform 200. For example, launcher 216 may facilitate the retrieval of launch data from various other components in the system, such as platform back end 210 through game launch service 218.

At step 306, the backend launch process is initiated. In some embodiments, as described above with regard to step 304, game launch service 218 may interface with platform back end 210. Accordingly, platform back end 210 may initiate one or more processes to facilitate the retrieval of launch data. For example, platform back end 210 may include a session manager, and the session manager may start a new user session and transmit information regarding the new user session to game launch service 218.

At step 308, the game provider launch process is initiated. In some embodiments, game launch service 218 may interface with game provider 214 to initiate the provider-specific launch flow for a particular game. For example, game provider 214 may initiate the configuration of the game in a manner that is specific to the game. This may be an alternative to, or in addition to, the launch processes conducted by game launch service 218 and platform back end 210. In some embodiments, the initiation of the game provider launch process may be excluded from method 300, such as when the game provider does not provide a specific launch process for the game.

At step 310, the launch data is constructed and transmitted. In some embodiments, game launch service 218 may construct and package the launch data and provide the launch data to launcher 216. For example, the constructed and packaged launch date may include instructions on how to configure the game client 206 within game window 208 such that it is displayed to user 202 through user interface 204. Accordingly, launcher 216 may then analyze the launch data and properly configure the instance of game client 206 within game window 208.

At step 312, a request to launch the game is sent to the game provider. In some embodiments, upon receiving the constructed and packaged launch data from game launch service 218, launcher 216 may interface with game provider 214 to launch the game within game client 206 embedded in game window 208 according to the parameters described by the constructed and packaged launch data. Accordingly, game provider 214 may retrieve and return the game requested such that game client 206 displays the game to user 202 and game window 208 provides the ability to interact with the game to user 202.

At step 314, the game is launched by the game client 206 in the game window 208. In some embodiments, the game is launched by the game client 206 in game window 208 such that user 202 can see unsuppressed assets of the game displayed by game client 206 and various assets of game window 208. Further, the game may be launched by the game client 206 in game window 208 such that game window 208 provides the ability to interact with elements of the game. For example, game window 208 may allow user 202 to call game client 206 by selecting a spin button such that game client 206 initiates an animation corresponding to a spin.

Figure 4:
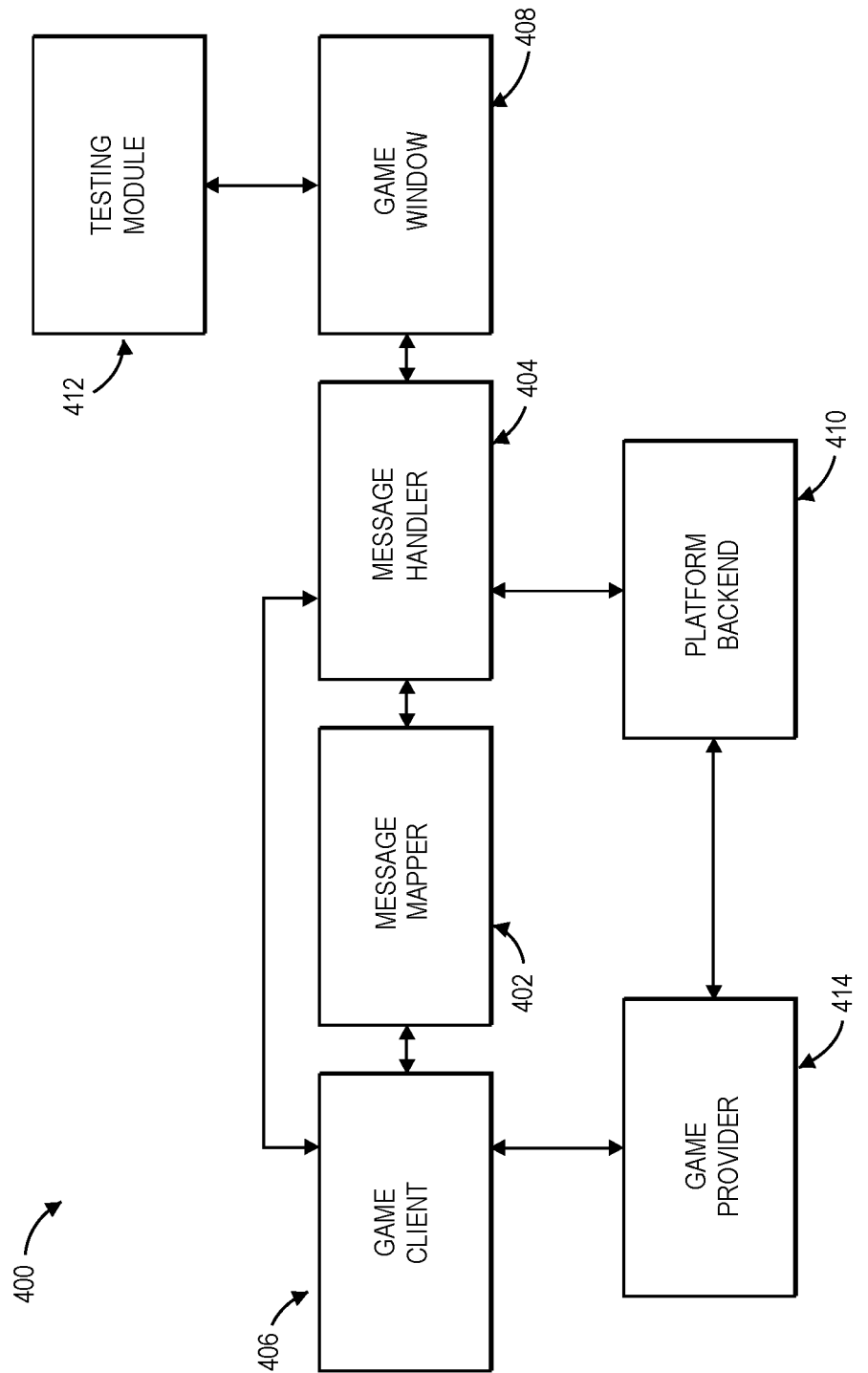
FIG. 4 illustrates an exemplary an event flow, in accordance with embodiments of the present disclosure.

Continuing on, FIG. 4 illustrates an example of message flow 400, in accordance with embodiments of the present disclosure. At a high level, message flow 400 may facilitate the communication between game client 406 and game window 408, generally corresponding to game client 206 and game window 208 of FIG. 2, respectively. As described above, game window 408 may receive input from a user that necessitates a transmission to another component of message flow 400, such as game client 406, game provider 414 (generally corresponding to the game provider 214 depicted in FIG. 2), and/or platform back end 410 (generally corresponding to the platform back end 210 depicted in FIG. 2). Further, various other components may send messages to game window 408. For example, game client 406 may communicate with game window 408 to prevent game window 408 from overlaying a menu, such as that depicted in gaming interface 500b, while an animation is being run by game client 406, such as a when a spinning animation is being run by game client 406.

In some embodiments, game client 406 may transmit a message to game window 408 in a different format than the messages understood by game window 408 and other components of the system. For example, the syntax of the message sent by game client 406 may differ from the syntax of the messages received by game window 408. As such, in some embodiments, game client 406 may interface with message mapper 402 in order to standardize the message to a format that is understandable by game window 408.

In some embodiments, message mapper 402 includes a library corresponding to the messages understood by game window 408, platform back end 410, and any other system components that may be receiving a message. The library may contain information regarding syntax and formatting specific to a particular instance of game provider 414. Accordingly, message mapper 402 may compare the message received from game client 406 to the library in order to translate the message to a standardized message format understood by game window 408.

Upon translating the message, message mapper 402 may transmit the message to message handler 404. In some embodiments, the message transmitted by game client 406 may already conform to the standardized message format understood by game window 408. As such, game client 406 may transmit the message directly to message handler 404 without transmitting the message to message handler 404. In some embodiments, message mapper 402 may route the message to the intended recipient of the message. For example, in the event that message handler 404 receives a message requesting game window 408 to suppress a display of the menu, message handler 404 may deliver the message to game window 408. For another example, in the event the message is a request by game window 408 to game client 406 requesting game client 406 display an updated balance, message handler 404 may deliver the message to message mapper 402 such that message mapper 402 can translate the message back to the syntax and formatting of the messages understood by game client 406 regarding the particular game provided by game provider 414, generally corresponding to game provider 214 depicted in FIG. 2.

In some embodiments, as described below with regard to FIG. 6, testing module 412, generally corresponding to testing module 220 depicted in FIG. 2, may conduct tests to ensure the proper handling of messages between game window 408 game client 406, and other components of the system. For example, testing module 412 may conduct tests on game window 408 such that testing module 412 causes the transmittal of a message by game window 408 to game client 406. As such, it may be determined whether or not game client 406 receives the message, and whether that message can be understood by game client 406. This may ensure that message handler 404 and message mapper 402 are functioning properly such that they are routing and translating messages accurately. This may further ensure that the interface elements associated with the message are functioning properly such that they are initiating action to occur in the system.

Continuing on, FIG. 5A illustrates an example of gaming interface 500a, in accordance with embodiments of the present disclosure. Gaming interface 500a may be displayed to a user, such as user 202 described above with respect to FIG. 2. Broadly, gaming interface 500a may contain game 502, game 502 being surrounded by a frame of game-agnostic components 506. Game 502 may be presented by a game client, such as game client 406 depicted in FIG. 4, while the frame, as well as the ability to interact with game 502, may be provided by a game window, such as game window 408 depicted in FIG. 4. Game 502 may be displayed in such a way that a user may see the events taking place in game 502. For example, game 502 may be "Spin-2-Win," where if the user presses spin control 504, an animation may be played showing the wheels of symbols of game 502 moving such that when they stop, the alignment of symbols in the rows corresponds to an amount won or an amount lost by the user.

In some embodiments, as discussed above, gaming interface 500a may include game-agnostic components 506. For example, gaming interface 500a may include a plurality of controls 506a (such as a pay table, audio controls, and rules) that are game agnostic such that all games may contain the plurality of controls 506a without affecting the game itself. In this example, a user may interact with the plurality of controls 506a in order to change the volume of sound being outputted by game 502, a feature that may be utilized in every game across all the game providers. Other game-agnostic components may include exit game button 506b, time 506c, and menu button 506d.

In some embodiments, gaming interface 500a may include a balance indicator 508. The balance indicator 508 may correspond to an amount of funds, such as physical funds or virtual funds, located in a financial account associated with the user interacting with game 502. As such, the amount shown by balance indicator 508 may update as a user interacts with game 502 and gaming interface 500a. Further, gaming interface 500a may include menu button 506d, when, upon being pressed, may initiate the opening of an additional user interface, such as gaming interface 500b.

Figure 5B:
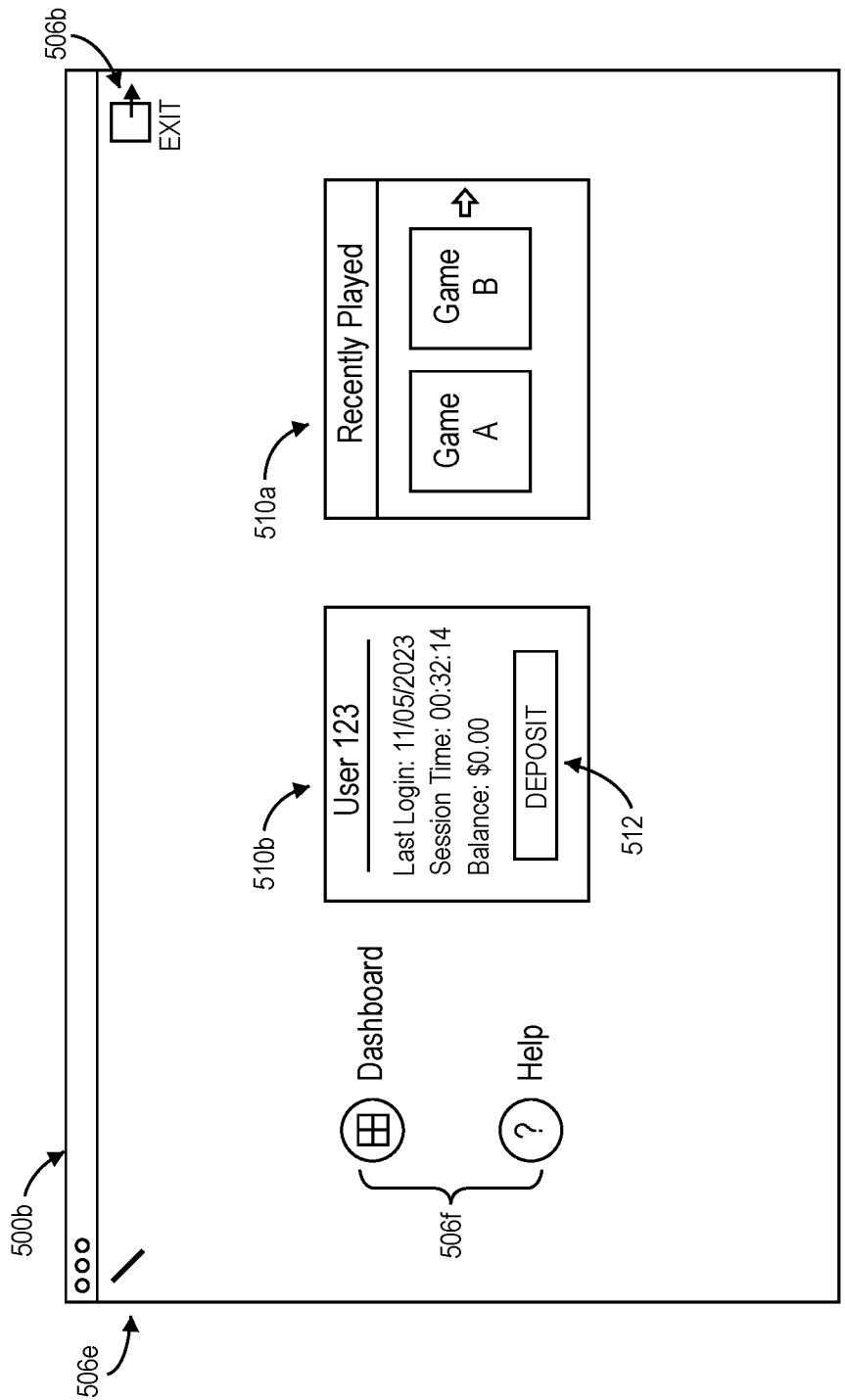
FIG. 5B illustrates an exemplary gaming interface, in accordance with embodiments of the present disclosure.

Continuing on, FIG. 5B illustrates an example of gaming interface 500b in accordance with embodiments of the present disclosure. In some embodiments, gaming interface 500b may be displayed to a user upon the user interacting with a menu button, such as menu button 506d depicted in gaming interface 500a. In some embodiments, gaming interface 500b may be presented to the user by a game window, such as game window 408, depicted in FIG. 4.

In some embodiments, gaming interface 500b may include some or all of the buttons displayed in gaming interface 500a, such as exit game button 506b. Gaming interface 500b may include additional components not displayed in gaming interface 500a. For example, gaming interface 500b may include additional instances of game-agnostic components 506, such as exit menu button 506e and menu applications 506f. In some embodiments, gaming interface 500b may display boxes containing information regarding a user. For example, gaming interface 500b may display recently played box 510a that provides information on the recently played games of a user. For another example, gaming interface 500b may display user profile box 510b that provides account information, such as the username, last login, the time, the session, and the account balance.

In some embodiments, gaming interface 500b may include deposit button 512. Upon selecting deposit button 512, the underlying game client may initiate a transaction with any number of back-end systems to withdraw the requested deposit amount from an account associated with the user. Accordingly, the underlying game client may request the update of one or more interfaces that display the balance of a user account, such as balance indicator 508 depicted in FIGS. 5A and 5C.

Figure 5C:
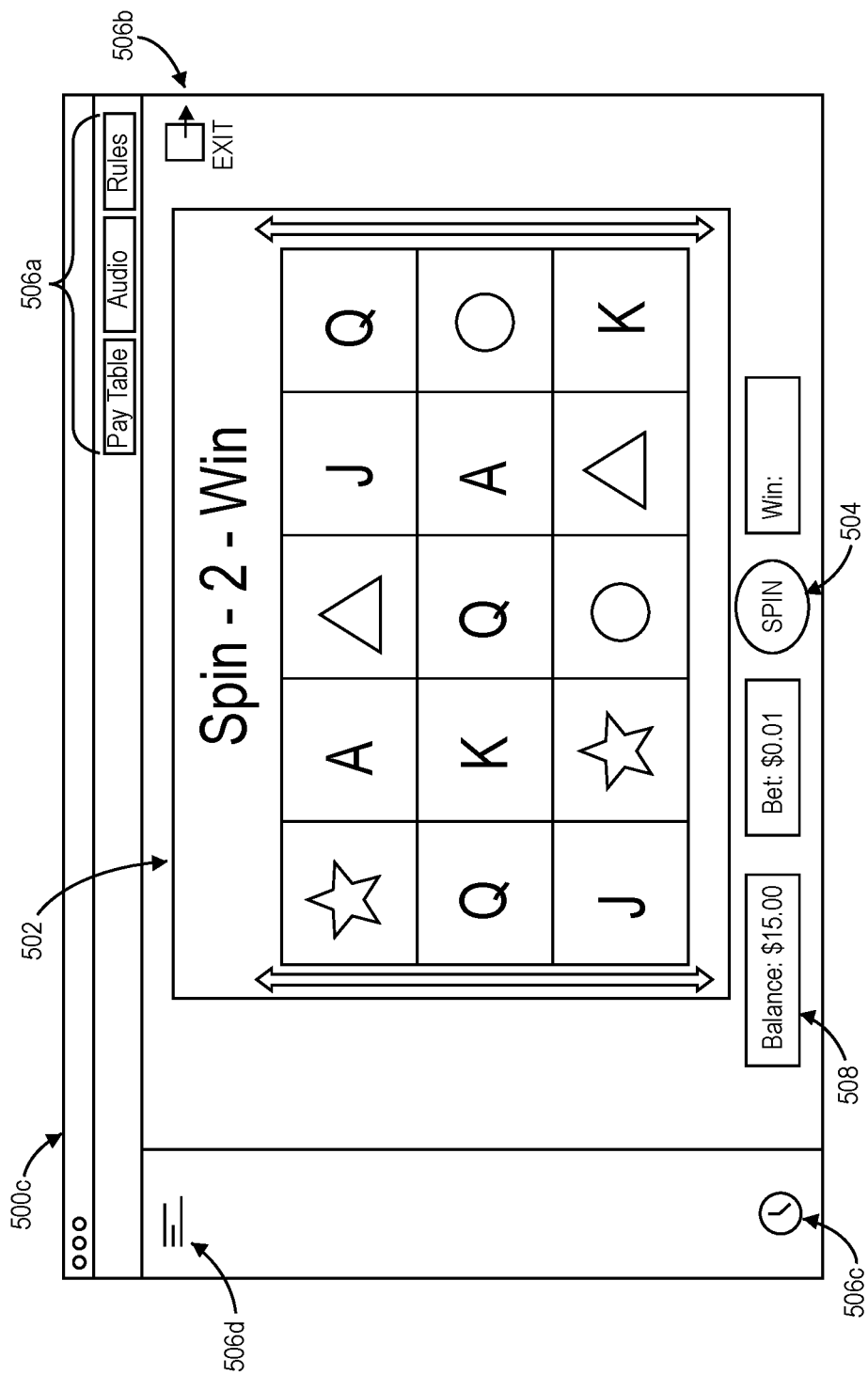
FIG. 5C illustrates an exemplary gaming interface, in accordance with embodiments of the present disclosure.

Continuing on, FIG. 5C illustrates an example of gaming interface 500c, in accordance with embodiments of the present disclosure. Broadly, upon user selecting exit menu button 506e, the display may return to game 502, as well as game-agnostic components 506 surrounding game 502. In some embodiments, upon the user selecting deposit button 512 of gaming interface 500b, gaming interface 500c may display the updated amount in balance indicator 508. For example, if balance indicator 508 initially displayed $0.00, as depicted in gaming interface 500a, if the user deposited $15, balance indicator 508 may be updated to display $15, as depicted in gaming interface 500c. In order to facilitate the updating of balance indicator 508, for example, the underlying game client may receive and/or send a message to the game window, as described above with respect to FIG. 2 and FIG. 4.

Figure 6:
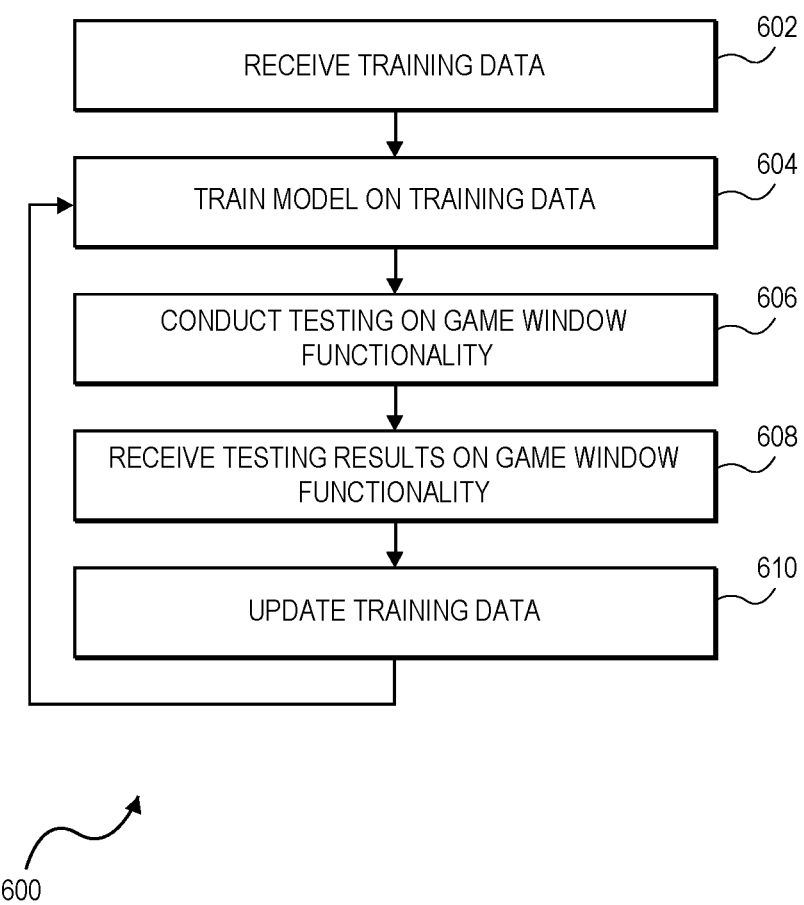
FIG. 6 illustrates an exemplary method flow chart, in accordance with embodiments of the present disclosure.

Continuing on, FIG. 6 depicts an exemplary flow chart for illustrating the operation of method 600 for testing the functionality of game client 406 embedded in game window 408, in accordance with embodiments of the present disclosure. In step 602, training data is received. As described above with respect to FIG. 2, the training data received may be any information now known or later developed, including, but not limited to, prior testing data, asset information, functionality information for game client 406 and game window 408, user interaction information, message library information, event handling information, game configuration information, game provider information, and any other information. In some embodiments, the training data may be received by one or more machine learning models associated with a training module, such as testing module 412 depicted in FIG. 4.

In step 604, a model is trained using the training data. In some embodiments, as discussed above with respect to testing module 220 and FIG. 2, the model may be trained using any technique now known or later developed, including, but not limited to, linear regression, logistic regression, support vector machines, naive bayes, k-nearest neighbors, boosting algorithms, decision trees, random forest, neural networks, classifiers, reinforcement learning, cluster analysis, k-means clustering, large language models, and similar machine learning models.

The model may be trained to optimize any number of processes. By way of example, game window 408 may be initially unaware of the locations of various components displayed to a user. As such, it may be difficult to automatically test the functionality of the front end, given that instructions on where to locate various components may be unavailable to testing module 412. As such, in some embodiments, the model may be trained to locate various components of a graphical user interface such that the training module may locate and test the various components. As such, the model may be trained on prior testing information regarding whether particular components were located, where they were located and/or not located, and any icons or images associated with the location of associated components. For example, the testing information may include whether a message was received by game client 406 when an area of the graphical user interface was selected by testing module 412, since that may indicate a component displayed on the graphical user interface was selected.

In step 606, testing is conducted on the functionality of game window 408. As described above with regard to step 604, testing module 412 may test any number of functionalities associated with game window 408 and game client 406. For example, testing module 412 may test whether or not the selection of the various components displayed on a user interface resulted in appropriate transactions occurring between game window 408, game client 406, platform back end 410, game provider 414, and other components of message flow 400.

In step 608, testing results from game window 408 testing are received. As discussed above, the testing of game window 408 may provide information to inform the system on the functionality of game window 408, game client 406, platform back in 418, game provider 414, and other components of the system, as well as inform future testing. For example, if testing results indicate that a particular component of the graphical user interfaces for games associated with a particular instance of game provider 414 is prone to error, future testing conducted may focus on ensuring that the particular component is operational.

In step 610, the training data is updated. In some embodiments, upon updating the training data, the model may be retrained in accordance with step 604. Accordingly, the model used by testing module 412 may be further optimized in any number of ways to perform testing on game window 408. For example, training data may be updated to include a more accurate estimation of the location of the various components on the graphical user interface associated with game window 408. Thus, testing module 412 may be able to select a more precise location associated with a component in future testing.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A system for providing a game to a user, the system comprising:
    a game client operable for providing the game;
    a game window in which the game client is embedded, the game window operable for receiving input corresponding to the game from the user;
    a message flow operable for facilitating a message transmission between the game client and the game window;
    a game provider operable to communicate with the game client and a component of a platform backend;
    a game launch service operable to obtain and construct a set of launch data corresponding to launching of the game from the platform backend; and
    one or more non-transitory computer-readable media comprising computer-executable instructions that, when executed by at least one processor, perform a method for providing the game to the user, comprising:
        receiving, at the game window, a request to launch the game, the game comprising a plurality of game controls;
        transmitting, to the platform backend, a data request for the set of launch data associated with the game;
        constructing, by the game launch service, the set of launch data comprising one or more instructions including at least an instruction for suppressing a game control from the plurality of game controls,
        transmitting, to the game provider, the request to launch the game;
        launching, in the game client, the game in accordance with the one or more instructions;
        providing, by the game window, a game-agnostic game control; and
        suppressing, by the game client, the game control from the plurality of game controls based on the instruction, wherein the game control corresponds to the game-agnostic game control.

2. The system of claim 1, wherein the game window is operable for providing a plurality of game agnostic components in a user interface.

3. The system of claim 1, wherein the system further comprises:
    a launcher operable to initiate the launching of the game in the game client.

4. The system of claim 1, wherein the system further comprises:
    a testing module operable to conduct a test on the game window.

5. The system of claim 4, wherein the test on the game window is configured to analyze the message transmission between the game client and the game window.

6. The system of claim 4, wherein the testing module includes one or more machine learning models trained on prior testing information.

7. The system of claim 1, wherein the component of the platform backend includes a user session manager.

8. A system for providing a game to a user, the system comprising:
    a game client operable for providing the game;
    a game window in which the game client is embedded, the game window operable for receiving an input corresponding to the game from the user;
    an event flow operable for facilitating a message transmission between the game client and the game window, the event flow comprising:
        an event mapper operable to translate a message from a first format to a second format; and
        an event handler operable to route the message to a recipient;
    a game provider configured to communicate with the game client and a component of a platform backend;
    a game launch service operable to obtain and construct a set of launch data corresponding to launching of the game from the platform backend; and
    one or more non-transitory computer-readable media comprising computer-executable instructions that, when executed by at least one processor, perform a method for providing the game to the user, comprising:
        receiving, at the game window, a request to launch the game, the game comprising a plurality of game controls;
        transmitting, to the platform backend, a data request for the set of launch data associated with the game;
        constructing, by the game launch service, the set of launch data comprising one or more instructions including at least an instruction for suppressing a game control from the plurality of game controls, transmitting, to the game provider, the request to launch the game;

launching, in the game client, the game in accordance with the one or more instructions;

providing, by the game window, a game-agnostic game control; and suppressing, by the game client, the game control from the plurality of game controls based on the instruction, wherein the game control corresponds to the game-agnostic game control.

9. The system of claim 8, wherein the first format is associated with the game client and the second format is associated with the game window.

10. The system of claim 9, wherein the event mapper is operable to translate the message from the second format to the first format when routed by the event handler from the game window.

11. The system of claim 8, further comprising:
a testing module operable to test whether the message has been translated from the first format to the second format by the event mapper.

12. The system of claim 8, further comprising:
a testing module operable to utilize a machine learning model to determine a button associated with the input of the user.

13. The system of claim 8, wherein the component of the platform backend includes a financial account associated with the user.

14. The system of claim 8, wherein the game client is operable to update a user interface element associated with the input upon receiving the message from the game window.

15. One or more non-transitory computer-readable media comprising computer-executable instructions that, when executed by at least one processor, perform a method of testing a game provided to a user, the method comprising:
receiving a set of training data;
training a model using the set of training data;
conducting training on the game provided to the user via a system comprising:
a game client operable for providing the game;
a game window in which the game client is embedded, the game window operable for receiving input corresponding to the game from the user;
an event flow operable for facilitating a message transmission between the game client and the game window;
a game provider configured to communicate with the game client and a component of a platform backend; and
a game launch service operable to obtain and construct a set of launch data corresponding to launching of the game from the platform backend,
wherein the system is operable to perform a system method for providing the game to the user, comprising:
receiving, at the game window, a request to launch the game, the game comprising a plurality of game controls;
transmitting, to the platform backend, a data request for the set of launch data associated with the game;
constructing, by the game launch service, the set of launch data comprising one or more instructions including at least an instruction for suppressing a game control from the plurality of game controls,
transmitting, to the game provider, the request to launch the game;
launching, in the game client, the game in accordance with the one or more instructions;
providing, by the game window, a game-agnostic game control; and
suppressing, by the game client, the game control from the plurality of game controls based on the instruction, wherein the game control corresponds to the game-agnostic game control; and
receiving, after conducting the training on the game provided to the user, a set of test results.

16. The one or more non-transitory computer-readable media of claim 15, wherein conducting the training on the game provided to the user comprises:
selecting a first interface element provided by the game window;
transmitting a message in a first format associated with the game window;
translating the message to a second format associated with the game client;
receiving, by the game client, the message; and
updating, by the game client a second interface element provided by the game client.

17. The one or more non-transitory computer-readable media of claim 16, wherein the set of test results includes an indication of if the game client updated the second interface element upon selecting the first interface element.

18. The one or more non-transitory computer-readable media of claim 15, wherein the method further comprises:
updating the set of training data; and
retraining the model using the set of training data.

19. The one or more non-transitory computer-readable media of claim 15, wherein the method further comprises:
launching the game client within the game window, wherein the game is provided by the game client.

20. The one or more non-transitory computer-readable media of claim 19, wherein the game window comprises a frame surrounding the game provided by the game client.

* * * * *